United States Patent Office 2,938,770
Patented May 31, 1960

2,938,770
PROCESS FOR THE PURIFICATION OF ALKALI METAL HYPOPHOSPHITE SOLUTIONS CONTAINING ALKALI METAL PHOSPHITES

René Pahud, Bex, Switzerland, assignor to La Fonte Electrique S.A., Bex, Switzerland, a corporation of Switzerland No Drawing. Filed June 2, 1958, Ser. No. 738,976

Claims priority, application Switzerland June 18, 1957

6 Claims. (Cl. 23—107)

This invention relates to a process for the purification of alkali metal hypophosphite solutions containing alkali metal phosphites.

Alkali metal hypophosphites are generally prepared by the oxidisation of yellow phosphorus in an aqueous solution of an alkali metal hydroxide. This process also results in the production of alkali metal phosphites, which must subsequently be removed if the pure hypophosphites are desired.

The usual method for the elimination of the undesirable phosphites is based on the fact that the hypophosphites of the alkaline earth metals are soluble, whereas the phosphites of these metals are insoluble. In order to precipitate the insoluble phosphites a soluble calcium or barium salt, e.g. calcium chloride, may be added to the solution to be purified.

While this treatment removes the phosphites in the solution, it also introduces other anions, e.g. chloride ions, which contaminate the solution. It has now been found that the presence of these other anions can be avoided by adding calcium hypophosphite, in lieu of e.g. calcium chloride, to the solution to be purified. The anion introduced in this fashion is the hypophosphite ion, and the solution would no longer contain other anions.

The industrial application of this very convenient possibility is unfortunately handicapped by the price of calcium hypophosphite. The conventional method for the production of this salt includes the difficult process of oxidising phosphorus by means of lime, which method suffers from the serious drawback of requiring costly and complicated equipment of low productive efficiency, making the product very expensive.

Calcium hypophosphite costs approximately twice as much as sodium hypophosphite.

The aim of the present invention is to circumvent these drawbacks.

The present invention provides a process for the purification of an aqueous alkali metal hypophosphite solution containing an alkali metal phosphite in which the phosphite ions are precipitated as insoluble alkaline earth metal phosphite by the addition of an aqueous solution of an alkaline earth metal hypophosphite in an amount stoichiometrically equivalent to the amount of alkali metal phosphite in the solution to be purified, the said aqueous solution of alkaline earth metal hypophosphite having been prepared from a concentrated aqueous solution of alkali metal hypophosphite by treatment with a cation exchanger whereby alkali metal ions are substituted by alkaline earth metal ions.

The drawbacks mentioned above are eliminated by the process of the present invention and the alkali metal hypophosphite solution used for the preparation of the alkaline earth metal hypophosphite can be drawn from the final solution obtained by the process.

The alkaline earth metal hypophosphite used in the process of the present invention is preferably calcium hypophosphite or barium hypophosphite.

The cation exchanger is preferably a sulphonated phenol-formaldehyde resin.

A cation exchange column can be used to exchange calcium or barium cations for alkali metal cations e.g. sodium cations.

When the exchanger is in the form of a calcium salt the sodium hypophosphite solution on passing through the column exchanges its sodium ions for calcium ions. A solution containing up to 85% of the initial hypophosphite in the form of calcium hypophosphite is obtained at the outlet of the column.

This solution can then be used for addition to solutions from which phosphite ions are to be eliminated.

The substitution takes place according to the following equation:

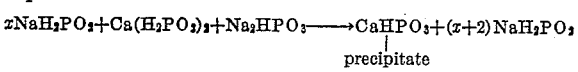
$$x\text{NaH}_2\text{PO}_2 + \text{Ca(H}_2\text{PO}_2)_2 + \text{Na}_2\text{HPO}_3 \longrightarrow \underset{\text{precipitate}}{\text{CaHPO}_3} + (x+2)\text{NaH}_2\text{PO}_2$$

The exchanger column can be used indefinitely, since it can be recharged with calcium ions by passing a calcium chloride solution through it periodically.

The following example illustrates the preparation of a calcium hypophosphite solution and subsequent purification of a sodium hypophosphite solution according to the process of the invention.

3000 litres of a dilute calcium chloride solution are passed through a column containing 500 litres of a sulphonated phenol-formaldehyde resin, and the column is subsequently flushed with water in order to remove the chloride anions. The column is then ready for operation. 300 litres of a concentrated sodium hypophosphite solution are circulated in this column. The solution emerging from the column has 80% of its hypophosphite content in the form of calcium hypophosphite. This solution is then used to purify an alkali metal hypophosphite solution containing an alkali metal phosphite as follows:

The 300 litres of solution containing calcium hypophosphite are mixed with a calculated volume of an aqueous sodium hypophosphite solution containing a known quantity of sodium phosphite. Calcium phosphite is precipitated immediately after mixing the two solutions. A few minutes are allowed for completion of this precipitation and the calcium phosphite precipitate is separated centrifugally or by filtration. The remaining solution consists of a pure hypophosphite solution.

What I claim is:

1. A process for the purification of an aqueous alkali metal hypophosphite solution containing an alkali metal phosphite in which the phosphite ions are precipitated as insoluble alkaline earth metal phosphite by the addition of an aqueous solution of an alkaline earth metal hypophosphite in an amount stoichiometrically equivalent to the amount of alkali metal phosphite in the solution to be purified, the said aqueous solution of alkaline earth metal hypophosphite having been prepared from a concentrated aqueous solution of alkali metal hypophosphite by treatment with a cation exchanger whereby alkali metal ions are substituted by alkaline earth metal ions.

2. A process according to claim 1 in which the alkali metal is sodium.

3. A process according to claim 1 in which the cation exchanger is a sulphonated phenol-formaldehyde resin.

4. A process according to claim 1 in which 80% of the alkali metal ions are replaced by alkaline earth metal ions in the cation exchanger.

5. A process for the purification of an aqueous alkali metal hypophosphite solution containing an alkali metal phosphite in which the phosphite ions are precipitated as insoluble calcium phosphite by the addition of an aqueous solution of calcium hypophosphite in an amount stoichiometrically equivalent to the amount of alkali metal phosphite in the solution to be purified, the said aqueous solution of calcium hypophosphite having been prepared from a concentrated aqueous solution of alkali metal hypophosphite by treatment with a cation exchanger whereby alkali metal ions are substituted by calcium ions.

6. A process for the purification of an aqueous alkali metal hypophosphite solution containing an alkali metal phosphite in which the phosphite ions are precipitated as insoluble barium phosphite by the addion of an aqueous solution of barium hypophosphite in an amount stoichiometrically equivalent to the amount of alkali metal phosphite in the solution to be purified, the said aqueous solution of barium hypophosphite having been prepared from a concentrated aqueous solution of alkali metal hypophosphite by treatment with a cation exchanger whereby alkali metal ions are substituted by barium ions.

References Cited in the file of this patent
UNITED STATES PATENTS

| | | |
|---|---|---|
| 2,595,199 | Lefforge et al. | Apr. 29, 1952 |
| 2,843,457 | Pernert | July 15, 1958 |